R. V. MORSE.
SIGHT CONTROLLING LINKAGE FOR ANTI-AIRCRAFT GUNS.
APPLICATION FILED SEPT. 13, 1917.
1,306,611.
Patented June 10, 1919.
2 SHEETS—SHEET 2.
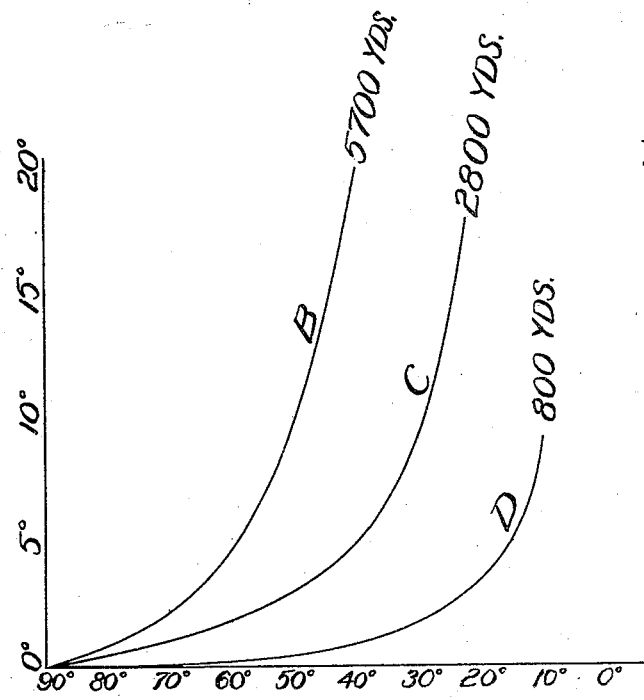
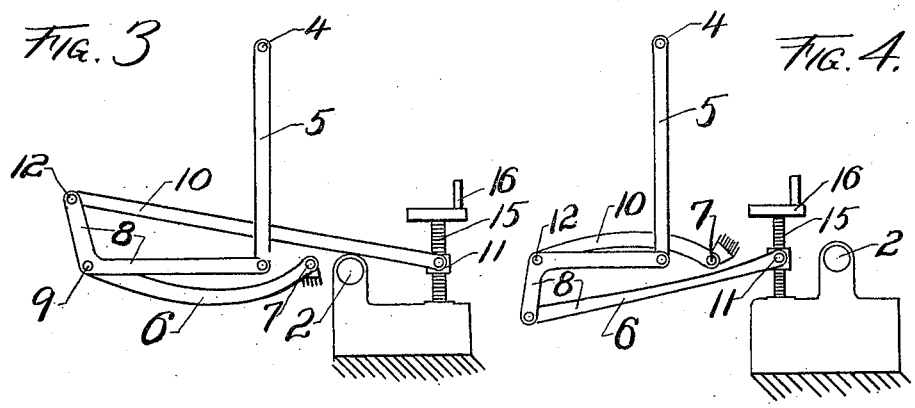
Robert V. Morse
INVENTOR

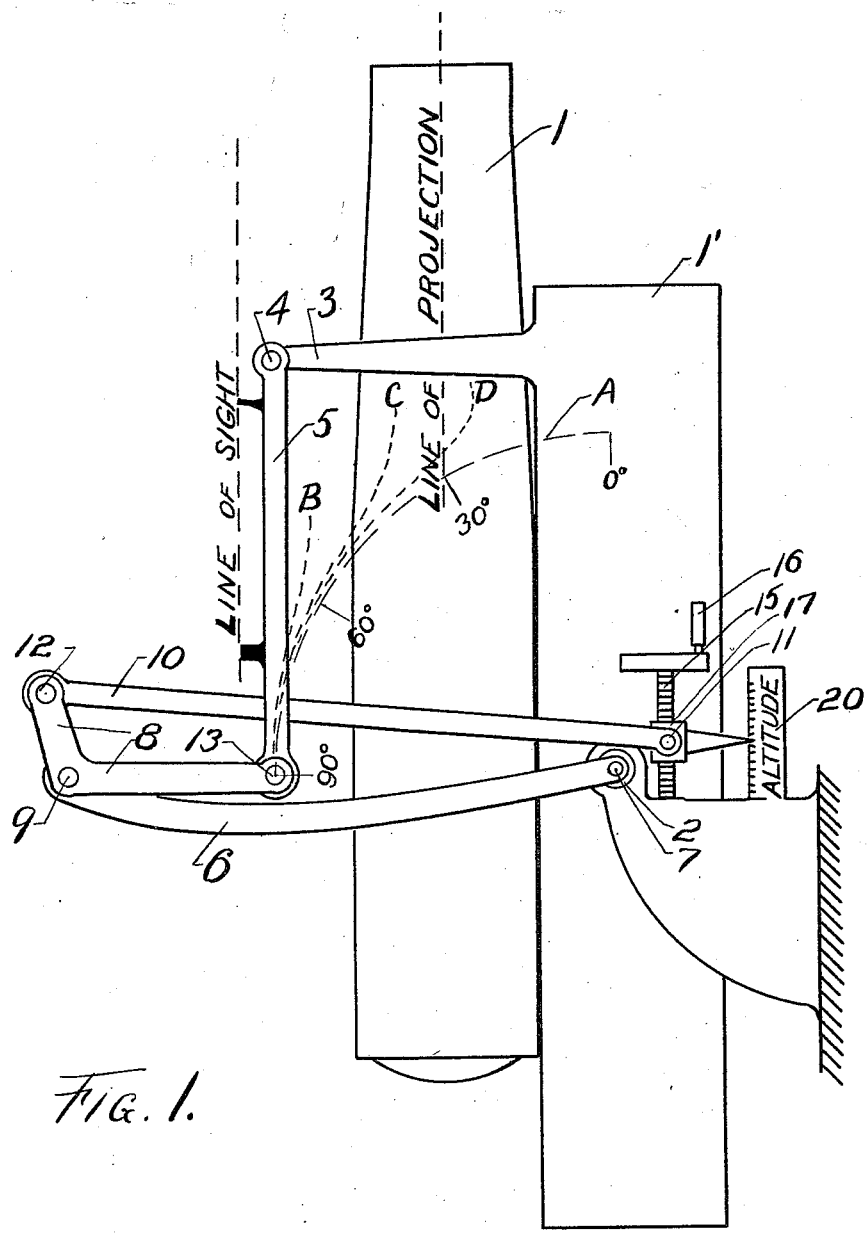

UNITED STATES PATENT OFFICE.

ROBERT V. MORSE, OF ITHACA, NEW YORK.

SIGHT-CONTROLLING LINKAGE FOR ANTI-AIRCRAFT GUNS.

1,306,611.       Specification of Letters Patent.     Patented June 10, 1919.

Application filed September 13, 1917. Serial No. 191,270.

*To all whom it may concern:*

Be it known that I, ROBERT V. MORSE, a citizen of the United States, residing in the city of Ithaca, in the county of Tompkins and State of New York, have invented a new and useful Sight-Controlling Linkage for Anti-Aircraft Guns, of which the following, taken with the accompanying drawings, is a specification.

This invention relates to the sighting apparatus of artillery stationed on the ground and employed against aircraft, and has for its object the automatic control of the line of sight so that it will always be accurately set irrespective of the variable angle of projection so long as the aircraft keeps a substantially constant flying level. When the apparatus is set for a given altitude, it will automatically control the angle of sight elevation so as to be correct for a target at any point in a horizontal plane at that altitude.

As an aircraft flying at a constant altitude approaches a gun stationed on the ground, the angle of projection of the gun increases, up to a value of 90° when the target is directly over the gun,—while the angle of elevation of the gun sight decreases from comparatively large values at low angles of projection to zero for an angle of position of 90°.

It has been proposed to construct linkages which will automatically reduce the sight elevation to zero as the gun swings to the vertical position,—it having been thought that if the sight were correct for one low angle of position and was reduced as the gun swung upward so as to have the correct sight elevation angle of zero when the gun was vertical, it would be sufficiently correct for all intermediate values. This however is not true unless the curve representing sight elevation for various angles of projection as produced by the automatic mechanism is similar in its general curvature to the actual desired curve as computed from accurate data. This actual curve desired gives angles of sight elevation which increase slowly at first as the gun swings down from the vertical, but increase more and more rapidly as the angle of projection becomes lower. The true curve is then characterized by increasing steepness as the angle of projection diminishes; and apparatus not having this characteristic was therefore inaccurate for various angles of projection except the vertical and a certain low value, and therefore useless for service.

One of the objects of this invention is to provide an automatic control whose curve of operation follows in its general characteristics the true curve desired, so that when accurate for the vertical and for some lower angles of projection, it will be approximately correct for all intermediate values. With guns thus equipped to fire accurately at any point in a given altitude, coördinated fire control becomes possible, since the altitude settings are the same for all the guns irrespective of their location.

In the drawings forming part of this specification, Figure 1 is an elevation of a linkage mechanism for automatically controlling the sight elevation for constant flying altitudes and varying angles of projection of the gun;

Fig. 2 illustrates the general type of sight elevation curve desired for constant altitude sight controlling apparatus;

Fig. 3 and Fig. 4 show modifications of the linkage of Fig. 1, though having the same general operating characteristics.

Considering first Fig. 2,—which is merely illustrative and does not show exact values,—the abscissæ indicate angles of projection of the gun and ordinates indicate angles of elevation of the sight. Each curve represents the values of sight elevation at various angles of projection, for a constant flying altitude of the target,—and each curve is accordingly labeled to indicate the altitude for which it holds true. It will be observed that the curves are in general concave upward, increasing in steepness toward the lower values of angle of projection. It is obvious that an apparatus whose characteristic curve was concave downward, for example, could not give even approximately accurate results in service.

Referring now to Fig. 1, the gun 1 mounted on the recoil cylinder 1' is arranged to swing in a vertical plane on the trunnions 2. The gun is shown with a 90° elevation for shooting vertically in the air. The bar 5 is pivotally attached at 4 to a bracket 3 fastened to the recoil cylinder or other part which follows the movements of the gun 1 as it is swung on the trunnions 2 to lower or higher elevations. The bar 5 lies parallel to the line of sight, and a telescopic sight or other form of sight may be attached thereto. In order to automatically control the angle of sight elevation,—that is, the angles between the line of sight and the line of projection of the gun,—the following linkage is provided, which elevates the end 13 of the sight bar 5 as the gun swings downward from the vertical. This control linkage consists essentially of three elements,—the link 6, the link 10, and the bell crank 8. The link 6 has a fixed pivot 7 at one end,—shown for example as located concentric with the trunnions 2, though other locations near the trunnion might be used for the point 7. The other end of the link 6 carries the pin 9 which provides a pivot for the bell crank 8 intermediate its ends. The outer ends of the bell crank 8 carry the pivots 12 and 13,—the pivot 13 connecting the bell crank 8 with the free end of the sight bar 5, while the pivot 12 connects the bell crank 8 with the link 10. The other end of the link 10 has an adjustable pivot point 11 which can be moved up and down by operating the screw 15 by means of the hand wheel 16, thus moving the nut 17 to which the pivot point 11 is attached. If desired, the pivot point 7 may be made adjustable instead of the pivot 11.

The operation is as follows:—as the gun swings down from the vertical, the sight bar 5 whose pivot 4 follows the movement of the gun, pulls the control linkage 6, 8, 10 around after it. The link 6, turning on the fixed pivot 7 causes the pivot 9 of the bell crank 8 to follow a circular arc around the pivot 7 as a center. The link 10, swinging around the pivot 11, causes the pivot 12 to describe another circular arc around the pivot 11 as a center. If these two circular arcs were concentric, as they would be if the pivots 7 and 11 were concentric with the trunnions 2,—then the bell crank 8 would not have any motion relative to the gun 1 or sight bar 5 as the gun swung, and the whole apparatus would merely move as a unit, as though the pivots 4, 9, 13 and 12 were rigid fastenings. But with the pivots 7 and 11 spaced as shown in Fig. 1, the end pivot 12 will tend to move farther away from the pivot 9 as the gun swings downward,—thus turning the bell crank 8 about the point 9 as a center, and swinging the end 13 upward so as to elevate that end of the sight bar 5. As the movement proceeds, and the points 7, 9, and 12 more nearly approach a straight line, the motion of the pivot 13 increases for a certain increase in the separation of the points 12 and 9; that is, the angular motion of the bell crank 8 increases rapidly as 7, 9, and 12 approach a straight line. This gives a more rapid increase in the sight bar elevation as the gun approaches the lower angles of projection. When the gun swings upward for higher angles of projection, the apparatus of course operates in the reverse manner.

Taking up the operation more in detail, we have seen that if the pivots 7 and 11 were located concentric with the trunnion 2, there would be no relative motion between the pivots 9 and 12, and the bell crank 8 would then be fixed relative to the gun. In that case the point 13 would follow an arc concentric with the trunnion 2, and the elevation of the sight bar 5 would remain unchanged as the gun swung downward. If the sight bar 5 was properly set parallel to the line of projection of the gun when the gun was vertical,—that is, if the angle of elevation of the sight bar were zero when the angle of projection of the gun was 90°,—then the sight bar elevation angle would remain zero for all other angles of projection, under the conditions supposed, and the point 13 would follow a circular arc A concentric with the gun trunnion 2.

It will be apparent that the angle of sight bar elevation will be determined by the distance which the point 13 lies above or outside of the circular arc A; in fact, the angle of sight elevation can be laid off directly on circular arcs struck with the pivot 4 as a center and the length of the sight bar 5 as a radius, starting with the arc A as a zero base and swinging outward. The curves of Fig. 2 may thus be laid out on Fig. 1, the angles of projection being laid out directly on the arc A, (zero being at the top and 90° at the point indicated by 13 in Fig. 1,)—while angles of sight elevation are laid off on circular arcs as described by the sight bar 5 swinging upward, with the zero points lying where these arcs cut the base arc A. The curves of Fig. 2 thus transposed to Fig. 1 are indicated in Fig. 1 by the broken lines B, C, D. These various curves B, C, D correspond to different flying altitudes of the target,—the curves corresponding to the higher altitudes diverging more rapidly from the base arc A than those for lower altitudes. In order that the apparatus may be set for any altitude, the pivot point 11 is made adjustable. As this point 11 is raised by operating the hand wheel 16 turning the screw 15, the divergence of the pivot points 9 and 12 is increased for a given movement of the gun, thus causing the curve described by the point 13 to diverge more from the base curve A. Thus the pivot 11 should be elevated for high altitudes and lowered for lower altitudes. A scale 20 may be provided to show the proper setting for a given altitude.

In adapting the linkage described to any particular set of sight elevation curves, the curves are laid out in the manner indicated in Fig. 1 and then the lengths of the links 6 and 10, and the length and angularity of the bell crank 8, are varied until the point 13 follows the curves B, C, D, etc., with the required degree of accuracy. The process is more or less tedious on a drawing board, and may be facilitated by constructing a dummy mechanism in which the above mentioned elements are arranged to be easily altered in extent. Once the precise proportions are thus determined, the actual mechanism is constructed with only the location of the point 11 capable of adjustment. It will be noted that the mechanism employs no sliding guides but uses only pivots which can be provided with wear compensating bushings so as to minimize the error which might otherwise result from wear.

It will be understood that the particular proportions of the linkage for a certain set of operating curves only hold good for the particular type of gun and ammunition on which the curves were based. Different trajectories resulting from using different guns or ammunition will of course necessitate slightly different proportions in the linkage. Hence no single linkage can be exactly accurate for all guns. But just as all trajectories have the same general type of curvature, so all the linkages will employ the same fundamental elements,—i. e.,—two links and a bell crank,—though the proportions and arrangements will slightly vary.

The same general elements may be arranged in slightly different relations and still produce substantially the same type of curve. For example, the pivot 7 need not be concentric with the trunnion 2, as shown in Fig. 3; or the bell crank 8 may be inverted, as shown in Fig. 4. Many other variations and adaptations of the mechanism will be apparent to those skilled in the art,—but in all the essential elements controlling the sight bar are two links and a bell crank, with means for adjusting the pivot point of a link. By selecting different proportions for these elements as has been described, an indefinite number of operating curves may be obtained,—all having the desired general characteristics but differing in degree. It is thus possible, by patient and careful selection, to closely approximate almost any set of constant altitude curves computed from ballistic data.

It should be understood that the apparatus described above may be changed and varied without departing from the essentials of the invention as outlined in the following claims.

I claim—

1. In a sight controlling device for antiaircraft guns, the combination of a bell crank, a fixed pivot, a link pivotally attached to the bell crank at one end, the other end of the link being attached to the fixed pivot, an adjustable pivot, a second link pivotally attached to the bell crank, the other end of said second link being attached to the adjustable pivot, a pivotal support attached to a part that moves with the vertical angular movements of the gun, a bar pivotally attached to the bell crank at one end and to said pivotal support at the other end and controlling the line of sight, and means for setting the adjustable pivot of the second link.

2. In a sight controlling device for antiaircraft guns, the combination of a bell crank, a link pivotally attached to the bell crank intermediate the ends of the bell crank, an adjustable pivot, a second link pivotally attached to the bell crank, the other end of said second link being attached to the adjustable pivot, means for setting the adjustable pivot of the second link, and means connected to the bell crank for controlling the line of sight.

3. In a sight controlling device for antiaircraft guns, the combination of a bell crank, a pivotal support attached to a part that moves with the vertical angular movements of the gun, a link pivotally attached to the bell crank at one end and to said pivotal support at the other end, a second pivotal support, another link pivotally attached to the bell crank at one end and to said second pivotal support at the other end, means for adjusting the distance between said pivotal supports of the two links, and means connected to the bell crank for controlling the line of sight.

4. In a sight controlling device for antiaircraft guns, the combination of a fixed pivot, an adjustable pivot, a pivotal support attached to a part which moves with the vertical angular movements of the gun, a sight controlling bar attached to said pivotal support, and a linkage connecting the fixed pivot, adjustable pivot, and pivotal support, said linkage being arranged to produce an increase in the sight angle of elevation as the gun is swung downward from the vertical, the rate of said increase increasing as the gun swings downward from the vertical toward the horizontal.

In witness whereof I have hereunto set my hand this 7th day of September, 1917.

ROBERT V. MORSE.

Witnesses:
ELMER H. WANZER,
F. S. BARR.

Copies of this patent may be obtained for five cents each, by addressing the "Commissioner of Patents, Washington, D. C."